(12) United States Patent  
Folts et al.

(10) Patent No.: US 7,989,983 B2  
(45) Date of Patent: Aug. 2, 2011

(54) POWER CONVERSION SYSTEMS

(75) Inventors: Douglas C. Folts, Baraboo, WI (US); Arnold P. Kehrli, Middleton, WI (US)

(73) Assignee: American Superconductor Corporation, Devens, MA (US)

( * ) Notice: Subject to any disclaimer, the term of this patent is extended or adjusted under 35 U.S.C. 154(b) by 0 days.

(21) Appl. No.: 12/625,093

(22) Filed: Nov. 24, 2009

(65) Prior Publication Data

US 2010/0277002 A1 Nov. 4, 2010

(51) Int. Cl.
*H02J 1/00* (2006.01)
(52) U.S. Cl. .......................................................... 307/82
(58) Field of Classification Search .................... 307/82
See application file for complete search history.

(56) References Cited

U.S. PATENT DOCUMENTS

| 5,625,539 | A | * | 4/1997 | Nakata et al. ............... 363/17 |
| 5,999,430 | A | | 12/1999 | Aritsuka |
| 6,111,767 | A | | 8/2000 | Handleman |
| 2004/0164557 | A1 | * | 8/2004 | West ............................. 290/1 R |
| 2007/0057651 | A1 | * | 3/2007 | Hoffman ..................... 323/258 |
| 2008/0238195 | A1 | * | 10/2008 | Shaver et al. ................. 307/18 |

FOREIGN PATENT DOCUMENTS

CN 101577509 11/2009
EP 1870996 12/2007
* cited by examiner

*Primary Examiner* — Robert L. Deberadinis
(74) *Attorney, Agent, or Firm* — Occhiuti Rohlicek & Tsao LLP

(57) ABSTRACT

In a general aspect, a power conversion system includes a power converter, a transformer, and a voltage adjustment device. The power converter is configured to receive a variable DC power generated by a power generation device and to convert the received DC power to AC power at a first voltage. The transformer is configured to receive the AC power from the power converter and to deliver AC power at a second voltage to a utility power network. The voltage adjustment device is configured to adjust the first voltage to a target value determined on the basis of a voltage of the DC power.

20 Claims, 13 Drawing Sheets

Temperature Coefficients

| | |
|---|---|
| Nominal Operating Cell Temperature (NOCT) | 45±2°C |
| Temperature Coefficient of Pmax | -0.47%/°C |
| Temperature Coefficient of Voc | -0.34%/°C |
| Temperature Coefficient of Isc | 0.045%/°C |

Fig. 6A

POWER CONVERSION SYSTEMS

FIELD OF THE INVENTION

This invention relates to power conversion systems.

BACKGROUND

Utility class solar photovoltaic (PV) inverters are used to convert DC power generated by a PV array into AC power for delivery to a utility power grid. The generated DC power has a variable voltage that depends on factors such as temperature, amount of loading, level of solar irradiance, and age. During normal operation of a PV system, the inverter provides a loading condition to the PV array that allows the PV array to operate at its maximum power point (MPP).

SUMMARY

In a general aspect, a power conversion system includes a power converter, a transformer, and a voltage adjustment device. The power converter is configured to receive a variable DC power generated by a power generation device and to convert the received DC power to AC power at a first voltage. The transformer is configured to receive the AC power from the power converter and to deliver AC power at a second voltage to a utility power network. The voltage adjustment device is configured to adjust the first voltage to a target value determined on the basis of a voltage of the DC power.

Embodiments may include one or more of the following.

The converter is an inverter. The voltage adjustment device is electrically connected to the transformer. The voltage adjustment device forms a part of the transformer. The voltage adjustment device comprises an on-load tap changer. The voltage adjustment device is further configured to adjust the first voltage to within a predetermined range of voltage.

The power converter includes a converter configured to convert the received DC power to AC power at a third voltage and an intermediate transformer configured to convert the AC power at the third voltage to AC power at the first voltage.

The power conversion system includes a first controller configured to determine the target value of the first voltage. The target value of the first voltage of the AC power is less than the voltage of the DC power by at least a predetermined design margin. The target value of the AC power is determined such that a current associated with the AC power is minimized. The second voltage is higher than the first voltage.

The DC power varies on the basis of a temperature of the power generation device. The power generation device includes a photovoltaic cell. The power generation device includes a wind power harvesting device. The power conversion system includes a second controller configured to control the power generation device to generate a predetermined amount of DC power.

The power conversion system includes a plurality of power converters, each power converter configured to receive DC power from a corresponding power generation device. The power conversion system includes a collector bus configured to receive the AC power from each of the plurality of power converters. The voltage adjustment device is configured to adjust the first voltage of the AC power on the collector bus. The power conversion system includes a plurality of collector buses, each collector bus configured to receive the AC power from a subset of the plurality of power converters.

In another general aspect, a method for controlling a power converter configured to receive a variable DC power generated by a power generation device and to convert the received DC power to AC power for delivery to a utility power network includes determining a target voltage of the converted AC power on the basis of a voltage of the variable DC power generated by the power generation device and controlling a voltage adjustment device to adjust the voltage of the converted AC power to the target voltage.

Embodiments may include one or more of the following.

The target voltage is determined such that the target voltage of the AC power is less than the voltage of the DC power by at least a predetermined design margin. Determining the target voltage of the AC power includes determining a minimum current associated with the AC power. The target voltage can be calculated in a variety of ways, including by a computer.

Controlling the voltage adjustment device includes determining an operational parameter of the voltage adjustment device. Determining the operational parameter includes using a look-up table. The operational parameter is determined using a feedback mechanism based on the voltage of the AC power converted by the power converter. The voltage adjustment device includes an on-load tap-changer (LTC) and the operational parameter includes a tap setting of the LTC. The method includes receiving, from a controller associated with the power generation device, a report of the voltage generated by the power generation device.

The power converter is configured to receive DC power generated by a plurality of power generation devices and the target voltage is determined on the basis of a minimum voltage of the DC power generated by the plurality of power generation devices. The target voltage is determined on the basis of a ratio between the voltage of the DC power received by the power converter and the voltage of the AC power converted by the power converter.

Controlling the voltage adjustment device includes allowing less than a predetermined number of adjustments in a given time period. Controlling the voltage adjustment device is performed on the basis of an expected change in the DC power. The method includes determining the expected change in the DC power on the basis of previous variations of the DC power.

In a further general aspect, a method includes receiving a variable DC power from a power generation device; converting the received DC power to AC power at a first voltage; increasing the voltage of the AC power to a second voltage; and delivering the AC power at a second voltage to a utility power network. The first voltage is determined on the basis of a voltage of the received DC power.

Embodiments may include one or more of the following.

Converting the received DC power to AC power includes using a voltage adjustment device to adjust the first voltage of the AC power. The voltage adjustment device includes an on-load tap-changer (LTC). Adjusting the first voltage of the AC power includes adjusting a tap setting of the LTC.

Among other advantages, the system and method described herein improve the efficiency of a PV installation and reduce its overall system cost. The AC output voltage of the inverter is adjusted to an optimum level for the inverter, enabling the magnitude and range of the AC output current from the inverter to be reduced. The reduced current allows lower-rated and thus less expensive inverters to be used. Furthermore, "clipping" of the output power of the inverter does not occur at low temperatures, minimizing the wasted power generated by the PV array but not converted to AC power by the inverter and increasing revenue from the PV array. In general, reduced current in the inverter also allows current to be reduced in the collector bus, the cabling between the inverter and the step-up transformer, and the bus-work within the inverter, improving overall system efficiency.

Other features and advantages of the invention are apparent from the following description and from the claims.

BRIEF DESCRIPTION OF DRAWINGS

FIG. 6A is a table giving temperature coefficients of the exemplary PV panel described in Table 1.

DETAILED DESCRIPTION

Figure 1:
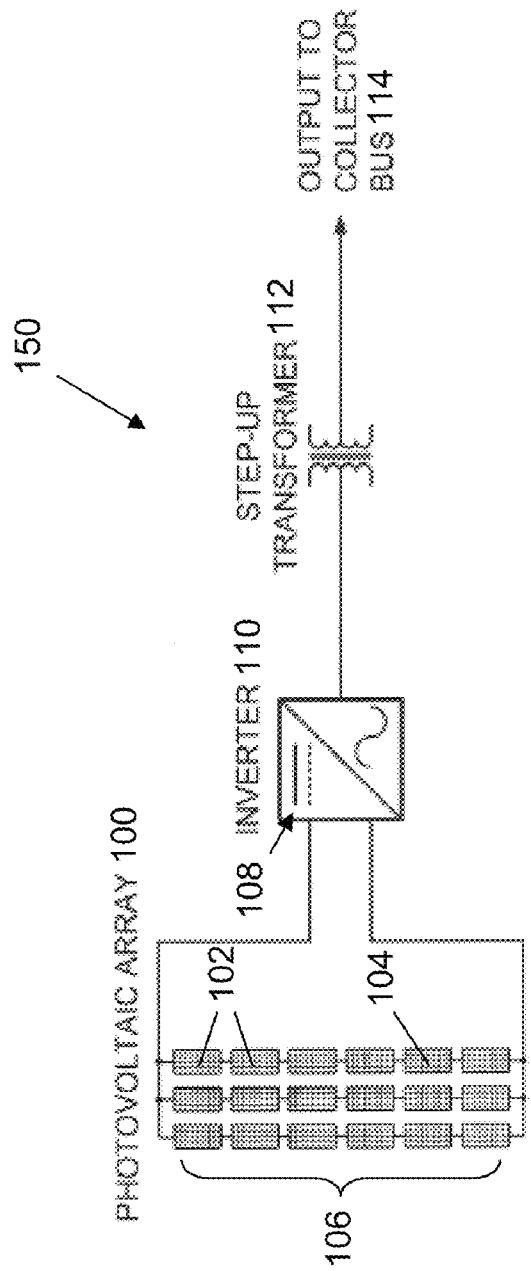
FIG. 1 is a schematic diagram of a grid-connected PV system.

Referring to FIG. 1, in a grid-connected solar photovoltaic (PV) system 150, a photovoltaic array 100 includes a collection of PV panels 102 connected in a series/parallel arrangement. Each PV panel is composed of multiple interconnected PV cells ("solar cells") 104. PV panels connected in series, known collectively as a "string" 106, enable a high operating voltage to be achieved. Multiple strings 106 are connected in parallel to achieve a target generated power rating of the PV array 100. PV array 100 is connected to a DC bus 108 of an inverter 110, which converts DC power generated by PV array 100 to AC power. The voltage of the AC power is increased by a step-up transformer 112 for delivery to a medium-voltage (e.g., 34.5 kV) collector bus 114. In some embodiments, PV array 100 generates a medium voltage and inverter 110 is a medium-voltage inverter that delivers converted medium-voltage AC power directly to collector bus 114.

Figure 2:
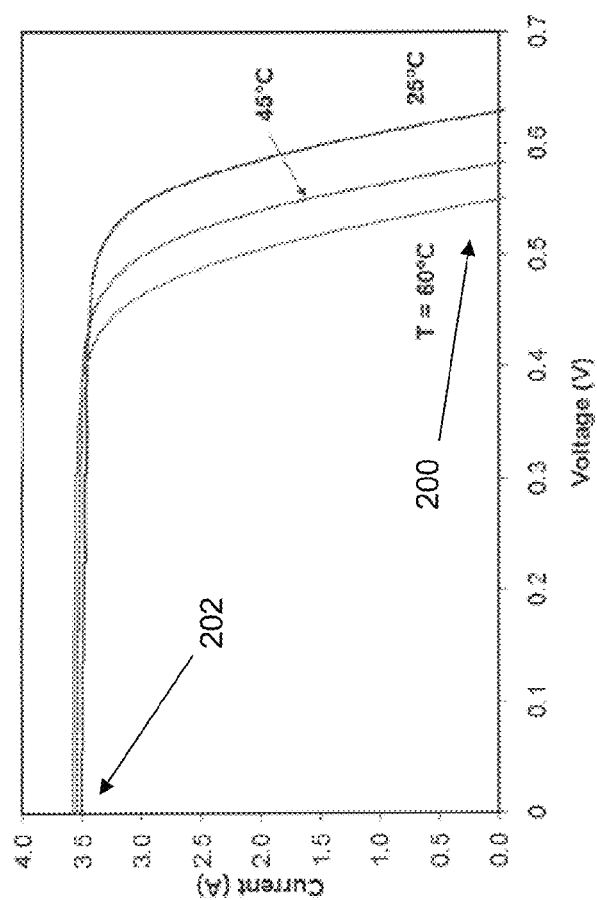
FIG. 2 is a graph showing the effect of temperature on the current-voltage characteristics of a solar cell.

Referring to FIG. 2, the terminal voltage versus current characteristic for a typical solar cell is shown for a fixed solar irradiance (i.e., the amount of sunlight shining on the solar cell). The open-circuit voltage, or the voltage across the solar cell at 0 A of load, varies inversely with solar cell temperature (region 200). The short-circuit current, or the current flow for zero voltage across the cell, is relatively constant (region 202).

Figure 3:
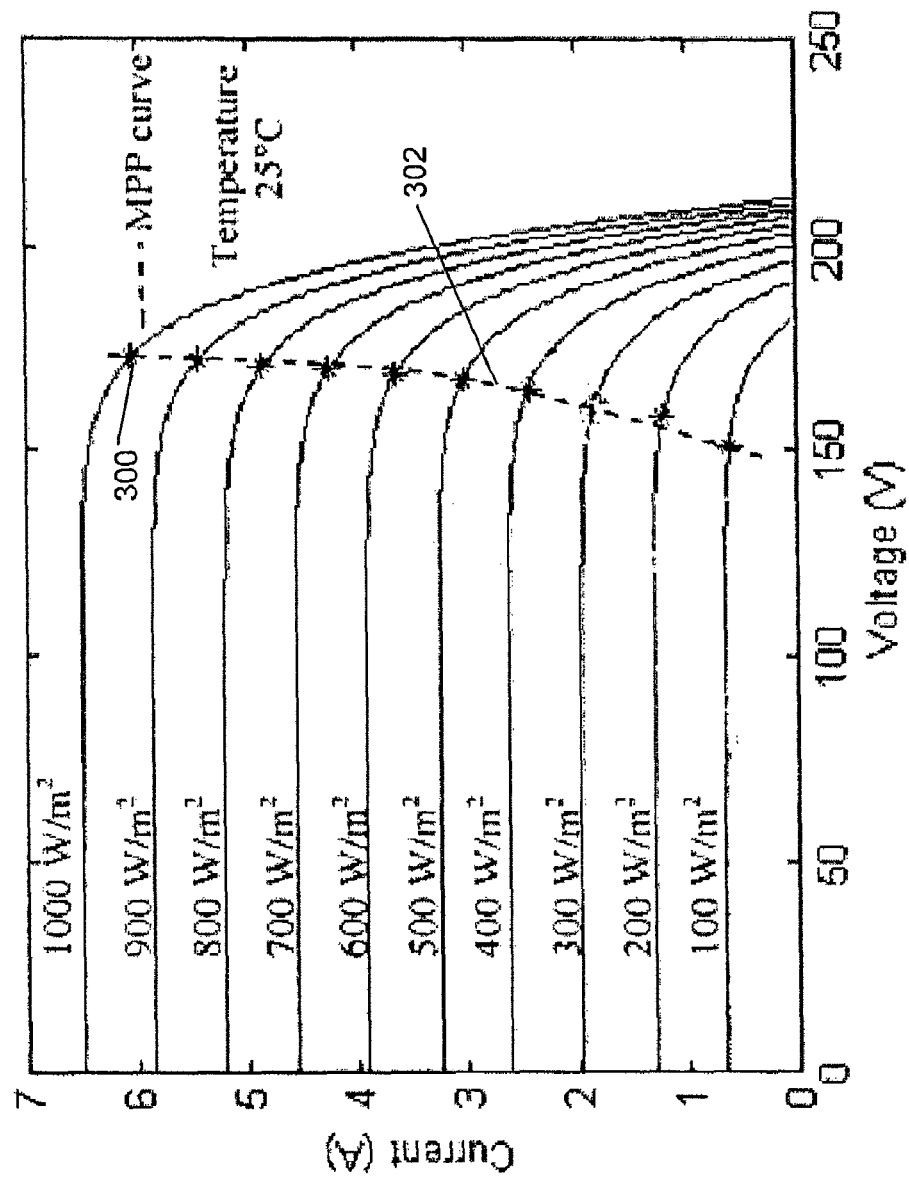
FIG. 3 is a graph showing the terminal characteristics of a string of PV panels at constant temperature for various solar irradiance levels.

Referring to FIG. 3, the shape of the terminal voltage versus current characteristic for a PV array is similar to that of an individual solar cell. The voltage range is greater for the array, reflecting multiple solar cells per PV panel and multiple PV panels in series; the current range is also greater, reflecting multiple solar cells and multiple PV panels connected in a series/parallel arrangement as described above. In FIG. 3, the temperature is held constant at 25° C.; each curve represents a different solar irradiance. A higher solar irradiance generates more current in the PV array.

Figure 4:
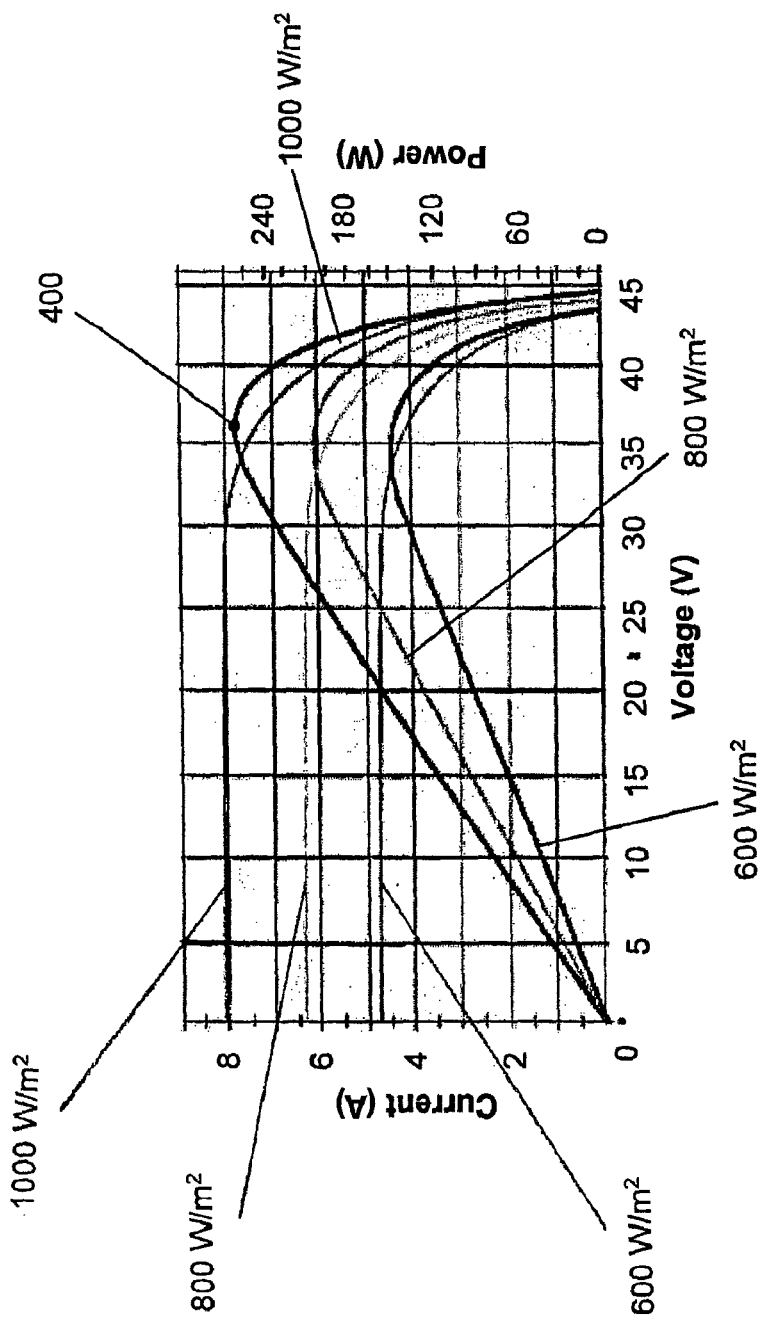
FIG. 4 is a graph of the current-voltage characteristics of a PV array and the power-voltage characteristics of the array for various solar irradiance levels.

Referring to FIGS. 3 and 4, to maximize the power produced by a PV array (and thus the value sold to a power utility), the PV array is operated at its maximum power point (MPP). The MPP is the point on the array's characteristic voltage-current (V-I) curve at which the product of PV array voltage and current reach a maximum, and depends on both solar irradiance and temperature. The MPP for an exemplary PV array is identified in FIG. 3 for each plotted solar irradiance level; an MPP curve 302 represents ideal operating points that maximize the power output of the PV string. For instance, for a solar irradiance of 1000 W/m$^2$, the MPP occurs at approximately 180 V and 6 A (point 300). Typical V-I curves (thin lines) and power curves (thick lines) at various solar irradiance levels for another exemplary PV array are shown in FIG. 4. The MPP for each solar irradiance level falls at the maximum point of each power curve. For instance, a point 400 on the 1000 W/m$^2$ power curve indicates the maximum power for that irradiance, which corresponds to the MPP (point 300) illustrated in FIG. 3.

Figure 5:
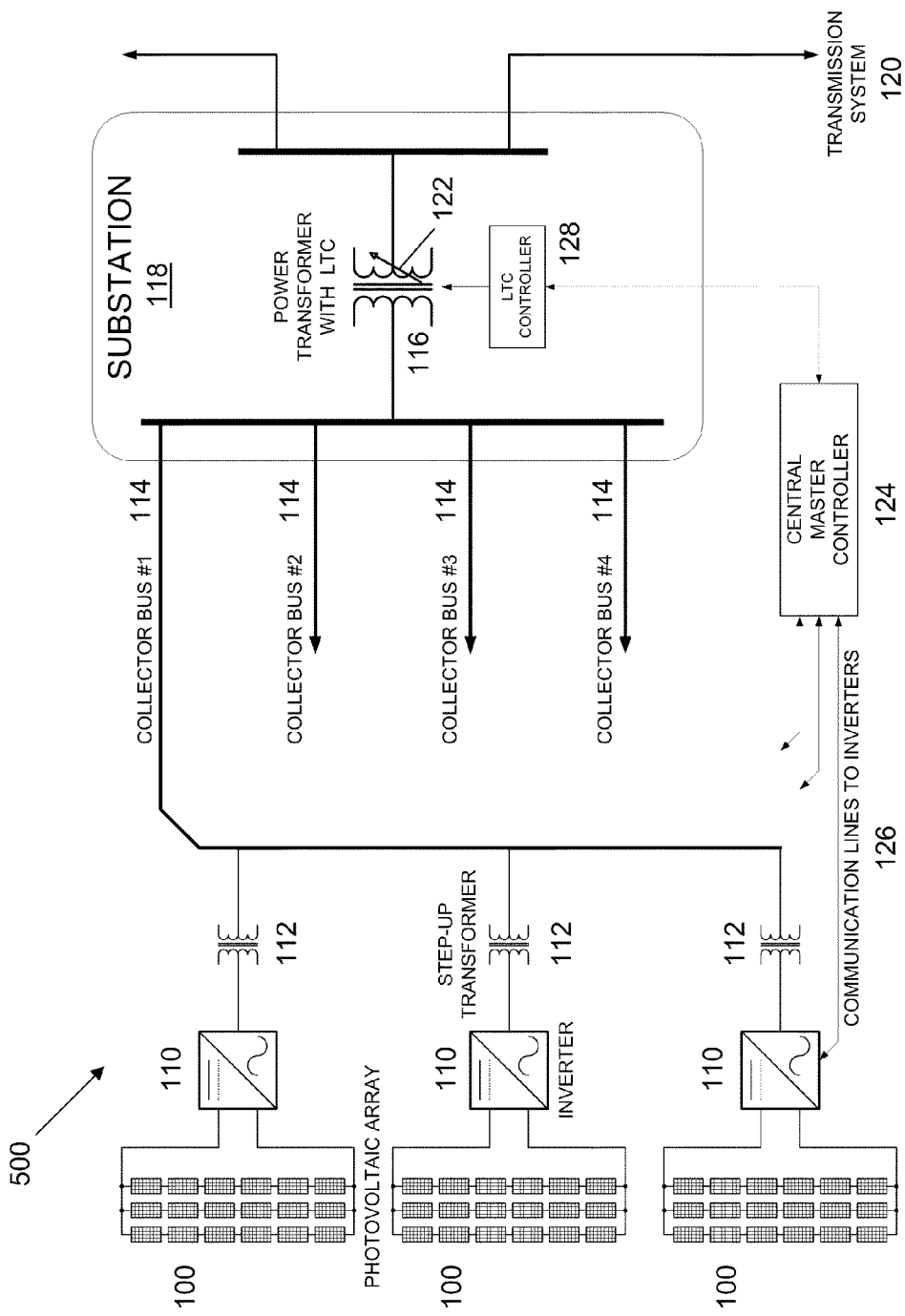
FIG. 5 is a schematic diagram of a utility scale PV installation.

Referring to FIG. 5, in a utility scale PV installation 500, collector bus 114 collects the AC output power from multiple inverters 110, each inverter connected to a PV array 100. The AC power carried on multiple collector buses 114 is stepped up to a transmission voltage (e.g., 138 kV) by a power transformer 116, e.g., at a substation 118. The AC power at the transmission voltage is delivered to a utility power transmission system 120.

A controller associated with inverter 110, known as the maximum power point tracker (MPPT), adjusts the DC bus voltage of the inverter to match the MPP of the PV array 100. The MPP varies throughout the day (and by season) as the temperature and solar irradiance change; the controller continuously maintains the DC bus voltage at the MPP even as conditions change. The MPPT is generally implemented in software by well-known algorithms. In other embodiments, the MPPT is implemented in circuitry. In the context of this description, the MPPT controls the electrical operating point of the PV array. Mechanical MPPTs that physically adjust the PV panels 102 to point directly at the sun as the sun moves across the sky also exist. In some embodiments, the MPPT of a small-scale PV system sets the DC bus voltage of the inverter to a predetermined percentage, such as 76%, of the open-circuit PV voltage at full sun conditions.

In order to maximize the efficiency and reduce the cost of a typical PV installation, the open-circuit DC output voltage of the PV array 100 is set as high as possible without exceeding each panel's maximum system voltage rating. The electrical characteristics of an exemplary PV panel are given in Table 1. For this PV panel, the maximum system voltage rating is 1000V.

TABLE 1

Specifications for electrical characteristics of an exemplary PV panel manufactured by Suntech Power Holdings Co., Ltd., San Francisco, CA.

| Characteristics | STP280-24/Vd |
| --- | --- |
| Open-circuit voltage ($V_{OC}$) | 44.8 V |
| Optimum operating voltage ($V_{mp}$) | 35.2 V |
| Short-circuit current ($I_{SC}$) | 8.33 A |
| Optimum operating current ($I_{mp}$) | 7.95 A |
| Maximum power at STC ($P_{max}$) | 280 Wp |
| Operating temperature | −40° C. to +85° C. |
| Maximum system voltage | 1000 V DC |
| Maximum series fuse rating | 20 A |
| Power tolerance | +/−3% |

STC conditions include 1000 W/m² irradiance, 25° C. module temperature, and air-mass value (AM) = 1.5.

Figure 6B:
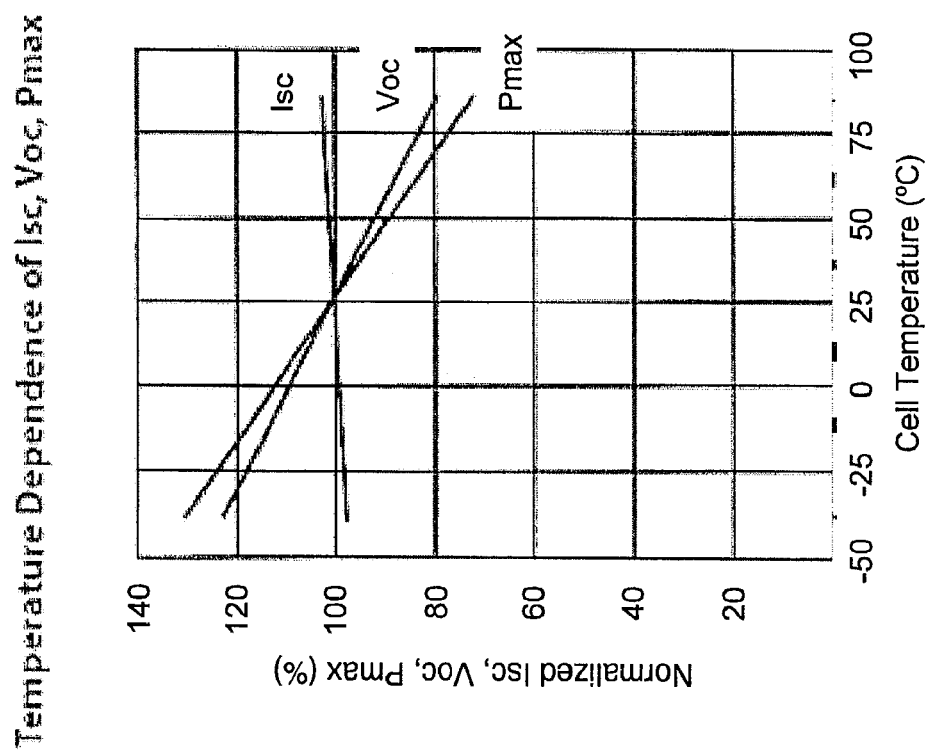
FIG. 6B is a graph illustrating the temperature dependence of the short-circuit current, open-circuit voltage, and maximum power of the PV panel described in Table 1.

Maximum system voltage occurs at open-circuit loading conditions on the coldest morning (ambient temperature) reached at the location of the PV installation. The temperature dependence of a solar cell (illustrated in FIG. 2) is typically specified numerically and graphically on PV panel data sheets. Referring to FIGS. 6A and 6B, for the exemplary PV panel described in Table 1, the temperature coefficient of the open-circuit voltage ($V_{OC}$) is −0.34%/° C. As stated in Table 1, the electrical characteristics of the panel are normalized to 25° C. Thus, if the minimum ambient temperature at the site of a PV system including the exemplary panel is −15° C., then the open circuit voltage at that temperature will be ((−15° C.−25° C.)*−0.34%/° C.)=+13.6%, or 13.6% higher than the open circuit voltage at 25° C. Since, from Table 1, $V_{OC}$ at 25° C.=44.8 V, then $V_{OC}$ at 15° C. is (1.13*44.8) V, or 50.86 V.

In order to keep the voltage of the PV system below its maximum voltage rating of 1000 V (at −15° C. and under open circuit conditions), 19 PV panels are connected in series, yielding a total system voltage of 967 V. (One additional PV panel would yield 1018 V, exceeding the 1000 V rating of the panels.) The maximum voltage that will appear on the DC bus of the inverter when the inverter is off (i.e., in a standby, non-operating state) is thus 967 V.

In this example, with 19 PV panels per string, the number of strings needed to generate a target PV array power of 1 MW at 25° C. can be calculated. As given in Table 1, the nominal power per PV panel is 280 W, meaning that each string generates 19*280 W=5.32 kW of power. Thus, a 1 MW PV array can be formed of 188 parallel strings.

Figure 7:
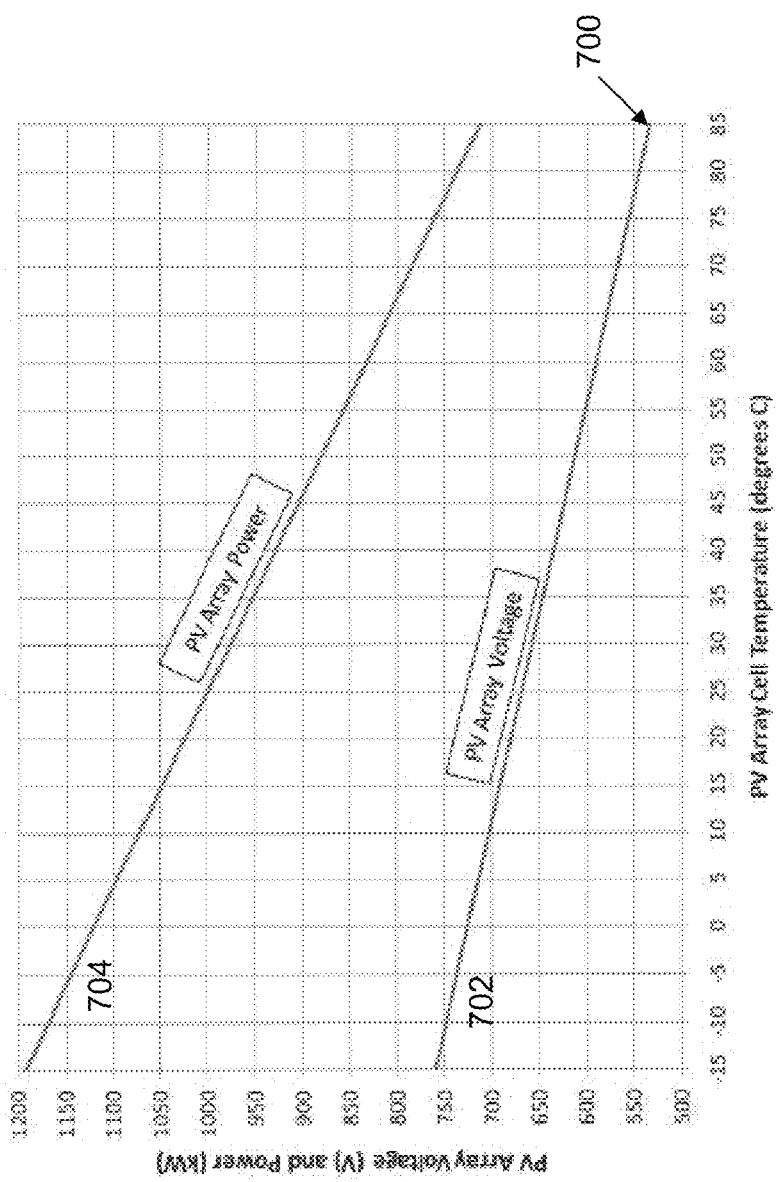
FIG. 7 is a graph illustrating the temperature dependence of the output power and voltage of an exemplary PV array.

Referring to FIG. 7, based on the temperature coefficient calculations above and assuming that the MPP voltage of the PV array has the same temperature coefficient as the open-circuit voltage, the output voltage (curve 702) and power (curve 704) of the exemplary PV array discussed above are calculated and plotted. The PV array voltage and power increase with decreasing temperature. In a typical PV panel, the solar cells are encased behind protective glass. Within this glass casing, the solar cells generally reach a temperature 25-30° C. warmer than the ambient temperature under full sun conditions on a calm, windless day. The 85° C. cell temperature may thus be selected as the point at which PV array output voltage is at a minimum. Neglecting voltage drops on the DC collector bus (108 in FIG. 1), the minimum PV array voltage is the minimum DC bus voltage at which the inverter is capable of operating.

To properly match an inverter to a PV array, the AC output voltage of the inverter is set based on the minimum DC voltage generated by the PV array, which occurs at the hottest expected ambient temperature at the location of the PV installation. The AC output voltage of the inverter and the rated power of the PV system determine the current rating of the inverter. As the ambient temperature decreases, a solar PV array generates more voltage, and thus more power. Eventually, at a low enough temperature, the inverter will meet its nameplate power rating. As the temperature continues to fall and the output of the PV array continues to increase, the inverter limits or "clips" the power to its nameplate rating in order to stay within safety agency requirements, such as the Underwriters Laboratories Inc. Standard for Safety for Static Inverters and Charge Controllers for Use in Photovoltaic Power Systems, UL 1741. Although more power may be available from the PV array at these lower temperatures, the inverter will not deliver power above its nameplate rating to the utility power grid. The excess power generated by the PV array but not delivered to the power grid represents lost revenue.

Even without the constraint of safety agency rating requirements, at a low enough temperature, the inverter will eventually reach its AC output current limit. The inverter is not able to further increase its output current beyond its output current limit to accommodate the increasing DC power generated by the PV array. Thus, although more power may be available from the PV array, the inverter will not deliver that power to the utility power grid, again resulting in lost revenue. A larger inverter with a higher current rating can be used to avoid clipping, but such an inverter costs more.

Figure 8:
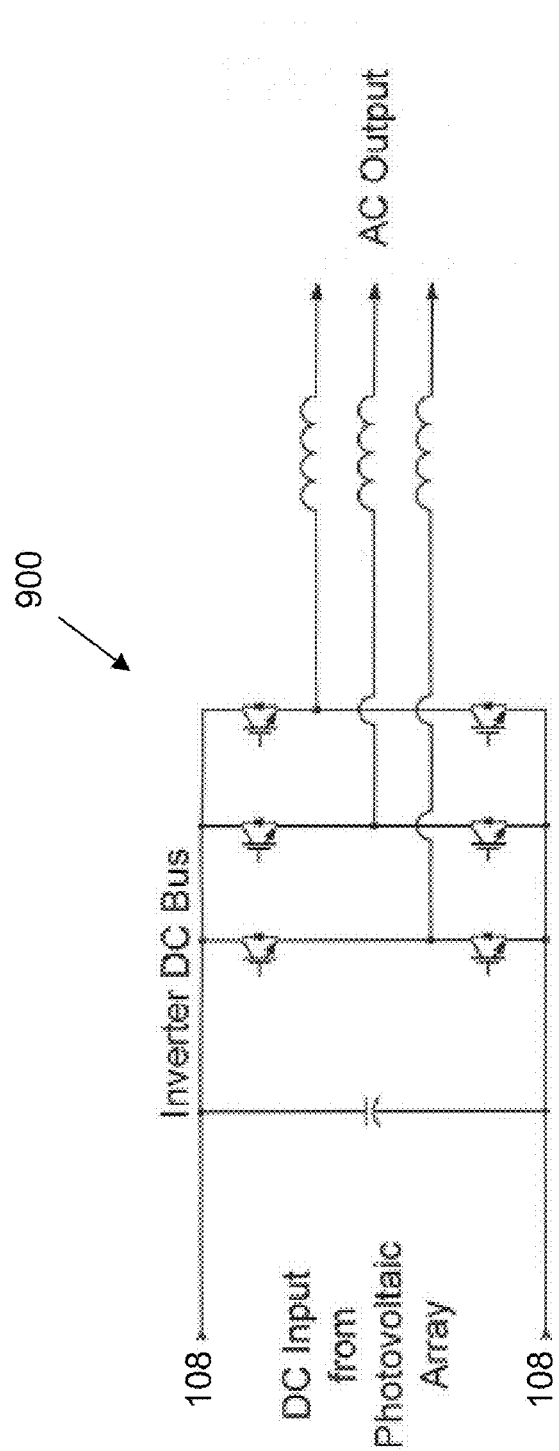
FIG. 8 is a schematic diagram of a three-phase inverter.

Referring to FIG. 8, an inverter 900 is a typical three-phase inverter with an "H-bridge." Inverter 900 receives DC input from the PV array along DC bus 108 and outputs AC power to a transformer 112 (as shown in FIG. 1 and FIG. 5) which steps up the inverter output voltage to the higher voltage of the collector bus 114. The minimum DC bus voltage of the inverter imposes an upper limit on the AC output voltage of the inverter beyond which the inverter controller cannot maintain adequate control over the AC output current. For inverter 900, the DC bus voltage is preferably greater than the peak value of the line-to-line AC voltage by some amount of design margin DM:

$$V_{DC} \geq DM \cdot V_{AC} \cdot \sqrt{2} \tag{1}$$

where DM represents a design margin prudent to assure that the inverter modulator maintains sufficient control of the output current, $V_{DC}$ is the DC bus voltage, and $V_{AC}$ is the RMS line-to-line AC output voltage from the inverter. DM=1.1 represents a 10% design margin. For this discussion, it is assumed the inverter incorporates a three-phase modulator capable of producing a theoretical AC voltage peak equal to the DC bus voltage at maximum modulation index (e.g. space vector modulation or conventional pulse-width modulation [PWM] with optimum third-harmonic reference injection).

As shown in FIG. 7, the minimum DC bus voltage (i.e., the minimum PV array voltage) is 532.4 V (point 700). For a 10% design margin, Eq. (1) gives the maximum AC voltage at the inverter output as 339 V. In a typical solar PV system, the AC output voltage is fixed, and the AC output current varies to accommodate the variable DC power generated by the PV array. The AC output voltage is generally selected to be several percent lower than the calculated maximum value in order to accommodate other system design constraints such as utility voltage variation, inverter efficiency, or voltage drops in the collector bus.

Figure 9:
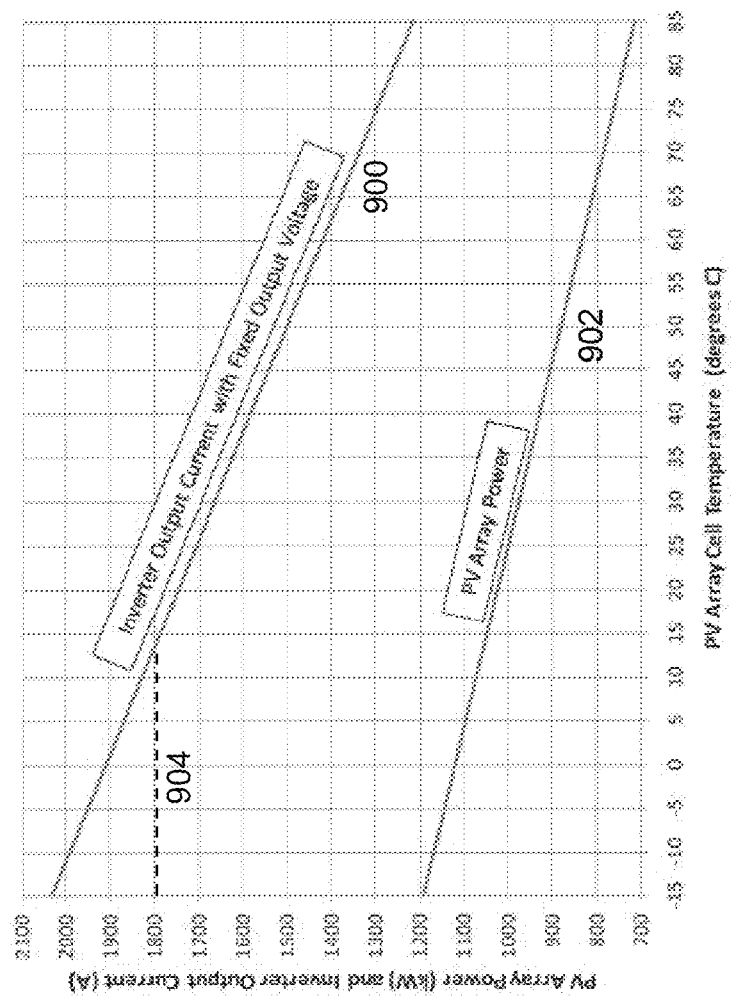
FIG. 9 is a graph illustrating PV array power and inverter output current versus temperature for a fixed AC output voltage from the inverter.

Referring to FIG. 9, disregarding these design constraints and using 339 V as the fixed AC output voltage of the inverter, the AC output current of the inverter is plotted versus temperature (curve 900) for the PV array illustrated in FIG. 1. At low temperatures, the PV array generates more DC power (curve 902), and the inverter thus produces a higher AC output current. As the temperature continues to drop, the inverter approaches its rated power limit or rated current limit. For instance, consider an inverter with a maximum AC output current rating of 1800 A. At temperatures below about 14° C., the DC power generated by the PV array would correspond to an output current from the inverter of greater than 1800 A. However, the inverter cannot accommodate this excess power and thus the AC output current from the inverter saturates at 1800 A (represented by a dashed line 904). That is, the inverter is unable to process the incremental PV array power produced as the temperature falls below 14° C. and instead "clips" the output at cold temperatures. Revenue from the incremental PV power capability below the clipping temperature is thus lost.

Figure 10:
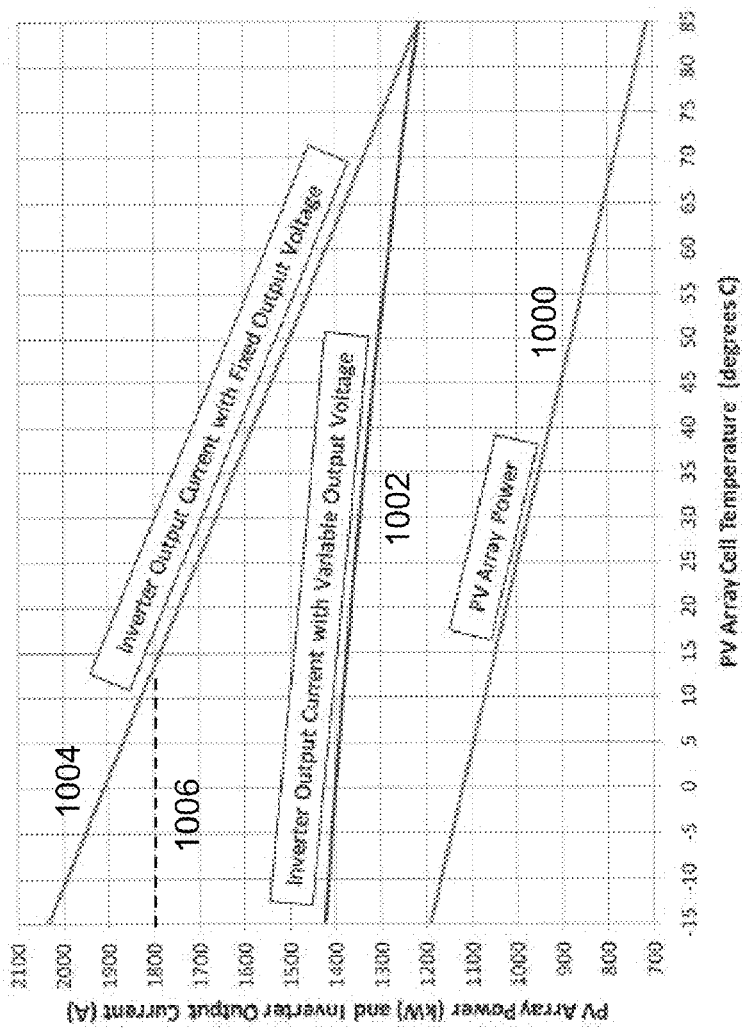
FIG. 10 is a graph illustrating inverter output current versus temperature for a fixed AC output voltage and a variable AC output voltage from the inverter.

Referring to FIG. 10, by allowing the AC output voltage from the inverter to vary, the inverter AC output current range can be reduced, as shown in a curve 1002. As discussed above, PV array voltage increases with decreasing temperature (curve 1000). With a fixed inverter output voltage, as shown in curve 1004 and as discussed above, the inverter output current correspondingly increases up to a maximum output current rating of the inverter (represented by a dashed line 1006). When the inverter output voltage is allowed to vary, some of the increase in DC power generated by the PV array is accommodated by an increase in inverter output voltage. The inverter output current thus increases more slowly and remains below the maximum output current rating of the inverter (curve 1002). The reduction in AC output current eliminates clipping of the output of a PV array at cold temperatures, improving overall PV system efficiency. Furthermore, because of the reduced AC output current, it may be possible to use an inverter with a lower current rating, reducing the cost of the PV installation.

Continuing the example given above and neglecting system losses for simplicity of calculation, the AC output voltage of the inverter is 339 V at 85° C. and the AC output current is 1214 A. At −15° C., the PV array voltage (and the inverter DC bus voltage) rises to 760 V (as shown in FIG. 7). Following Eq. (1), for a fixed inverter output voltage, the AC output current would be 2032 A at −15° C. (curve 1004 of FIG. 10). However, given that the maximum AC output current rating of the inverter is 1800 A, clipping occurs and not all of the power generated by the PV array is transferred by the inverter. In contrast, when the inverter output voltage is allowed to vary, the output voltage is increased to 483.5 V at −15° C., which corresponds to only 1424 A of AC output current from the inverter (curve 1002 of FIG. 10). This reduction in current allows the inverter to fully process the 1192 kW of PV array power (483.5 V*1424 A*$\sqrt{3}$=1192 kW, where $\sqrt{3}$ reflects the three-phase AC output of the inverter). That is, at −15° C., the output current from an inverter with a variable output voltage is about 30% less than the output current from an inverter with a fixed output voltage, and more of the DC power generated by the PV array is transferred by the variable voltage inverter. An inverter with a lower current rating can thus be used. Since the cost of an inverter is related to its current rating, a variable output voltage allows the use of a lower-current-rated and less expensive inverter.

To generate a variable AC output voltage from the inverter, any number of variable voltage transformer technologies (e.g., a Variac or Powerstat®) may be used on the low-voltage side of the step-up transformer (112 in FIG. 1) connected to inverter 110. However, Variacs are prohibitively expensive and would more than offset the savings in inverter cost. In general, any device that can be controlled to adjust the AC voltage may be used.

Referring again to FIG. 5, an on-load tap-changer (LTC) 122 associated with the main power transformer 116 that connects the solar PV installation to the utility grid 120 is used to vary the inverter AC output voltage. For large (e.g., greater than 20 MW) solar PV installations, it is common to have a dedicated power transformer (e.g., transformer 116) feeding the medium-voltage collector buses 114 that combine the collective output of multiple PV arrays 100 and inverters 110. That is, there are no distribution circuits feeding industrial or residential loads off the medium voltage. Thus, the voltage on collector bus 114 can be varied over a wide range without damaging loads designed to accept a fairly constant voltage.

Generally, a power transformer with an LTC accepts a varying voltage on the high-side (transmission voltage primary) and provides a regulated voltage on the low side (medium voltage secondary). For instance, regulating a +/−10% input voltage to within +/−0.625% on the output (medium voltage) side is a common application for a power transformer with an LTC.

Figure 11:
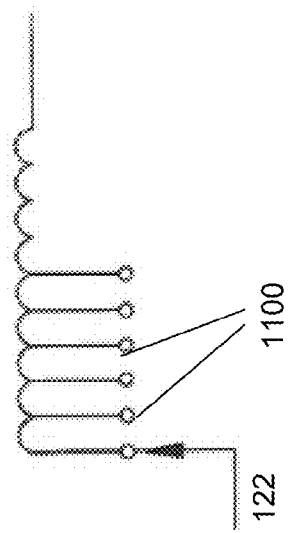
FIG. 11 is a schematic diagram of an on-load tap-changer connected to a transformer with multiple taps.

Referring to FIG. 11, each phase of the three-phase power transformer (116 in FIG. 5) is wound to include several voltage taps 1100. LTC 122 connects to one of the taps 1100 and is able to change from one tap to another without interrupting the load current or shorting out the transformer. An LTC typically has 10-22 tap positions for linear taps (such as shown in FIG. 11). In other embodiments, an LTC is used with additional transformer windings in a coarse/fine or plus/minus switching scheme that yields 15-35 effective tap positions.

Figure 12:
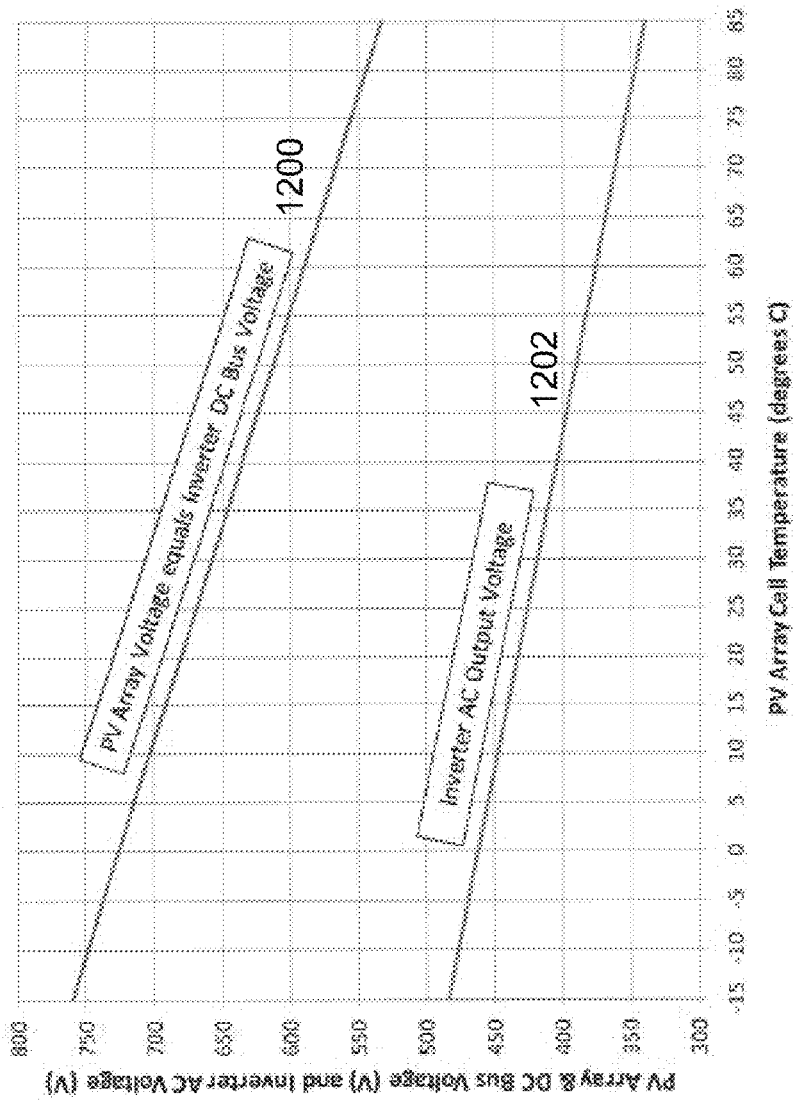
FIG. 12 is a graph illustrating inverter DC bus voltage and AC output voltage versus temperature.

Rather than using a power transformer with an LTC to regulate the low-side voltage, as an LTC is typically used, the LTC 122 is used to vary the low-side collector bus (114 in FIG. 1 and FIG. 5) AC voltage. Referring to FIG. 12, in order to accommodate changes in the DC voltage generated by the PV array (curve 1200), the AC voltage on the collector bus varies from 339 V to 483.5 V (curve 1202). An LTC with a +/−15% range is used to regulate this 30% variation in collector bus AC voltage. Optionally, the use of a +/−20% LTC would allow a +/−5% variation in transmission voltage on the transmission lines (120 in FIG. 5) to also be accommodated. A +/−20% LTC is well within the capability of power transformer manufacturers.

A power transformer with a standard +/−10% LTC generally costs about 25% more than a power transformer without an LTC. A wide range LTC (e.g., +/−20%) may cost an additional 10%. For a 100 MVA transformer costing $2 M, and for a wide range LTC that may add 35% to the cost of the transformer, the incremental cost of the transformer in order to achieve a variable AC voltage on the collector bus would be $700 k. This cost is offset by the roughly 30% savings achieved by using an inverter with a lower current rating as noted above. For instance, for a 100 MW solar PV installation with one hundred 1 MW inverters, each costing $250 k, the inverter savings is 30% of $250 k for each of the one hundred inverters, for a total of $7.5 M in savings. That is, the inverter savings may be over ten times the cost for the LTC used to generate a variable AC voltage to the inverter. In general, for large utility-scale PV installations (e.g., >20 MW) with a dedicated collector bus and a power transformer, the variable AC voltage mechanism lowers the overall cost of the PV installation.

For smaller PV installations, a distribution voltage regulator may be used on a medium voltage collector bus dedicated to several PV inverters. Distribution voltage regulators employ an LTC connected to an auto-transformer, which is a tapped transformer without a secondary. This design is preferable for small PV installations in which the point of connection (POC) to the utility grid is at the distribution voltage (i.e., the medium voltage) and/or in which the medium voltage feeds other loads. The combination of an LTC and an auto-transformer can be designed for a wide voltage range.

An LTC accepts contact closure commands to signal it to switch up or down by one tap on the main transformer. A solar PV installation such as shown in FIG. 5 has a microprocessor-based central master controller 124 that communicates with each of the individual PV inverters 110 via communication lines 126. Each inverter includes a MPPT controller that regulates the DC bus voltage of the inverter to the MPP of the PV array 100 feeding the inverter. The MPP is a function of solar cell temperature, solar irradiance, and other factors, and varies throughout the day. Each inverter reports its DC bus voltage to the central master controller on a periodic basis (e.g., once per second). The master controller executes instructions that select the minimum value of all reported inverter DC bus voltages, compute a target AC voltage based on the minimum DC bus voltage using Eq. (1), and issue the appropriate up or down commands to an LTC controller 128, which controls the LTC to connect to the tap closest to the target AC voltage.

In some embodiments, the master controller computes the target AC voltage based on an average DC bus voltage across all inverters of the PV installation or based on a minimum DC bus voltage plus a fixed percent. In other embodiments, the master controller computes the ratio of the measured DC bus voltage to the measured AC output voltage for each inverter and, based on the lowest ratio, the average ratio, or another metric, determines whether an up or down tap change is needed to bring the ratio within a target window. Other characteristics of the DC bus voltages may also be used as a basis for determining the target AC voltage.

Any of a number of methods may be used to determine the tap setting of the LTC once the target AC voltage is determined. An open-loop control scheme uses a look-up table of tap setting versus target voltage range. The voltage range of each tap step spans a 0.5% to 2% voltage range, depending on the number of effective LTC tap positions in the transformer. A closed-loop control scheme uses the AC output voltage reported by each inverter to the master controller to determine if an up or down tap change is needed to bring the measured inverter AC voltage within a predetermined target window of the target AC voltage. The target window is based on the target AC voltage and takes into account the granular resolution (i.e., voltage per tap step) of the LTC.

The algorithms implemented by the master controller include filtering and anticipatory algorithms to minimize how often the LTC is commanded to change taps. Since the mechanical and contact life of an LTC are typically in the range of 500,000 operations or more, the controller preferably commands no more than 68 LTC tap changes per day in order to allow a 20 year minimum life for the LTC. To minimize tap changes, the window for the target AC voltage may be widened and/or hysteresis may be added to the calculation for determining when a tap change is needed. That is, the PV installation operates, on average, at an AC voltage lower than that predicted by Eq. (1), which translates to a slightly higher inverter current. Practically, this situation has little negative impact on the power conversion efficiency, as additional inverter current is generally available on all but the coldest days (see, e.g., FIG. 10).

In some embodiments, the master controller stores the daily inverter DC bus voltage versus time information. Using the resulting daily profiles, the inverter 'learns' that the DC bus voltage changes quickly in the morning as temperature and solar irradiance increase, remains fairly constant throughout the hot midday period, and changes quickly again as the sun sets. With this learned profile, the master controller allocates more of the tap change budget to the early morning and the late afternoon, knowing that relatively few tap changes will be needed during the longer midday period. This learning algorithm may be further enhanced by providing the outside temperature, the PV module temperature, and/or readings from solar irradiance sensors as inputs to the algorithm. Historical meteorological and climate data for the site of the solar PV installation may also be pre-loaded and used by such an adaptive algorithm.

If the PV installation includes only one single large energy source and one inverter, the functions of the centralized master converter may be performed by a controller within or forming a part of the inverter controller.

The variable inverter output voltage concept has been described above in the context of a solar PV installation. However, a variable output voltage inverter can also be applied to other DC energy sources that generate a variable output voltage and/or a variable output power with temperature. More generally, a variable output voltage inverter can be applied to other DC energy sources that generate a variable output voltage based on another factor other than temperature. For instance, the conversion efficiency of a wind power installation can be improved by use of such an inverter.

In some embodiments, the temperature coefficient of the open-circuit voltage is positive and the output of the DC energy source increases with temperature. The same principles described above also apply to these systems.

It is to be understood that the foregoing description is intended to illustrate and not to limit the scope of the invention, which is defined by the scope of the appended claims. Other embodiments are within the scope of the following claims.

What is claimed is:

1. A power conversion system comprising:
    a power converter configured to receive variable DC power generated by a power generation device and to convert the received DC power to AC power at a first voltage;
    a transformer configured to receive the AC power from the power converter and to deliver AC power at a second voltage to a utility power network; and
    a voltage adjustment device configured to adjust the first voltage to a target value determined on the basis of a voltage of the DC power.

2. The power conversion system of claim 1, wherein the voltage adjustment device forms a part of the transformer.

3. The power conversion system of claim 1, wherein the voltage adjustment device comprises an on-load tap changer.

4. The power conversion system of claim 1, wherein the power converter comprises:
    a converter configured to convert the received DC power to AC power at a third voltage; and
    an intermediate transformer configured to convert the AC power at the third voltage to AC power at the first voltage.

5. The power conversion system of claim 1, wherein the target value of the AC power is determined such that a current associated with the AC power is minimized.

6. The power conversion system of claim 1, wherein the power generation device includes a photovoltaic cell.

7. The power conversion system of claim 1, wherein the power generation device includes a wind power harvesting device.

8. The power conversion system of claim 1, wherein the second voltage is higher than the first voltage.

9. The power conversion system of claim 1, further comprising a second controller configured to control the power generation device to generate a predetermined amount of DC power.

10. A method for controlling a power converter configured to receive a variable DC power generated by a power generation device and to convert the received DC power to AC power for delivery to a utility power network, the method comprising:
   determining a target voltage of the converted AC power on the basis of a voltage of the variable DC power generated by the power generation device; and
   controlling a voltage adjustment device to adjust the voltage of the converted AC power to the target voltage.

11. The method of claim 10, wherein determining the target voltage of the AC power includes determining a minimum current associated with the AC power.

12. The method of claim 10, wherein controlling the voltage adjustment device includes determining an operational parameter of the voltage adjustment device, and determining the operational parameter includes using a look-up table.

13. The method of claim 10, wherein controlling the voltage adjustment device includes determining an operational parameter of the voltage adjustment device, and wherein the operational parameter is determined using a feedback mechanism based on the voltage of the AC power converted by the power converter.

14. The method of claim 10, wherein controlling the voltage adjustment device includes determining an operational parameter of the voltage adjustment device, and wherein the voltage adjustment device includes an on-load tap-changer (LTC) and the operational parameter includes a tap setting of the LTC.

15. The method of claim 10, further comprising receiving, from a controller associated with the power generation device, a report of the voltage generated by the power generation device.

16. The method of claim 10, wherein the power converter is configured to receive DC power generated by a plurality of power generation devices and the target voltage is determined on the basis of a minimum voltage of the DC power generated by the plurality of power generation devices.

17. The method of claim 10, wherein the target voltage is determined on the basis of a ratio between the voltage of the DC power received by the power converter and the voltage of the AC power converted by the power converter.

18. The method of claim 10, wherein controlling the voltage adjustment device includes allowing fewer than a predetermined number of adjustments in a given time period.

19. The method of claim 10, wherein controlling the voltage adjustment device is performed on the basis of an expected change in the DC power.

20. A method comprising:
   receiving variable DC power from a power generation device;
   converting the received DC power to AC power at a first voltage, the first voltage determined on the basis of a voltage of the received DC power;
   increasing the voltage of the AC power to a second voltage; and
   delivering the AC power at a second voltage to a utility power network.

* * * * *